(12) United States Patent
Cho

(10) Patent No.: US 6,214,154 B1
(45) Date of Patent: Apr. 10, 2001

(54) METHOD FOR MANUFACTURING RIM OF STEERING WHEEL FOR VEHICLES

(76) Inventor: Youn-soo Cho, 504-201 Hyojachon, 301 Seohyun-dong, Bundang-gu, Sungnam-city Kyungki-do (KR)

( * ) Notice: Subject to any disclaimer, the term of this patent is extended or adjusted under 35 U.S.C. 154(b) by 0 days.

(21) Appl. No.: 09/288,015

(22) Filed: Apr. 8, 1999

(30) Foreign Application Priority Data

| May 14, 1998 | (KR) | 98-17424 |
| May 14, 1998 | (KR) | 98-17425 |
| Sep. 8, 1998 | (KR) | 98-36990 |
| Sep. 8, 1998 | (KR) | 98-36991 |
| Feb. 2, 1999 | (KR) | 99-3368 |

(51) Int. Cl.[7] .................................................. B29C 65/00
(52) U.S. Cl. ........................ 156/285; 427/282; 427/434.3
(58) Field of Search ............................ 427/282, 434.3; 118/402; 156/240, 277, 285

(56) References Cited

U.S. PATENT DOCUMENTS

| 4,010,057 | * | 3/1977 | Nakanishi | 156/285 |
| 4,229,239 | * | 10/1980 | Arai et al. | 156/230 |
| 4,231,829 | * | 11/1980 | Marui et al. | 427/434.3 |
| 5,075,052 | * | 12/1991 | Malvassora | 427/267 |
| 5,183,688 | * | 2/1993 | Sorko-Ram | 427/282 |
| 5,750,190 | * | 5/1998 | Woodhall et al. | 427/282 |
| 5,786,028 | * | 7/1998 | Cantwell | 427/282 |
| 6,022,438 | * | 2/2000 | Watanabe et al. | 427/149 |

FOREIGN PATENT DOCUMENTS

| 60-143961 | 7/1985 | (JP) . |
| 61-130081 | 6/1986 | (JP) . |
| 7-117326 | 5/1995 | (JP) . |
| 9-1996 | 1/1997 | (JP) . |

* cited by examiner

*Primary Examiner*—Shrive Beck
*Assistant Examiner*—Kirsten A. Crockford
(74) *Attorney, Agent, or Firm*—Leydig, Voit & Mayer, Ltd.

(57) ABSTRACT

A rim of a steering wheel is manufactured by forming a molded member of a urethane material as a part of the rim of a steering wheel; attaching a first mask member to a part of a surface of the molded member; forming a first transfer surface by hydraulic transfer onto a surface where the first mask member is not present; forming a film on the first transfer surface; removing the first mask member to reveal a surface where transfer has not occurred; performing a second hydraulic transfer onto the surface where transfer has not occurred; and cleaning the film. Thus, a clear pattern can be formed without overlapping or unsmooth matching of a pattern of a transfer film.

13 Claims, 11 Drawing Sheets

FIG. 9A
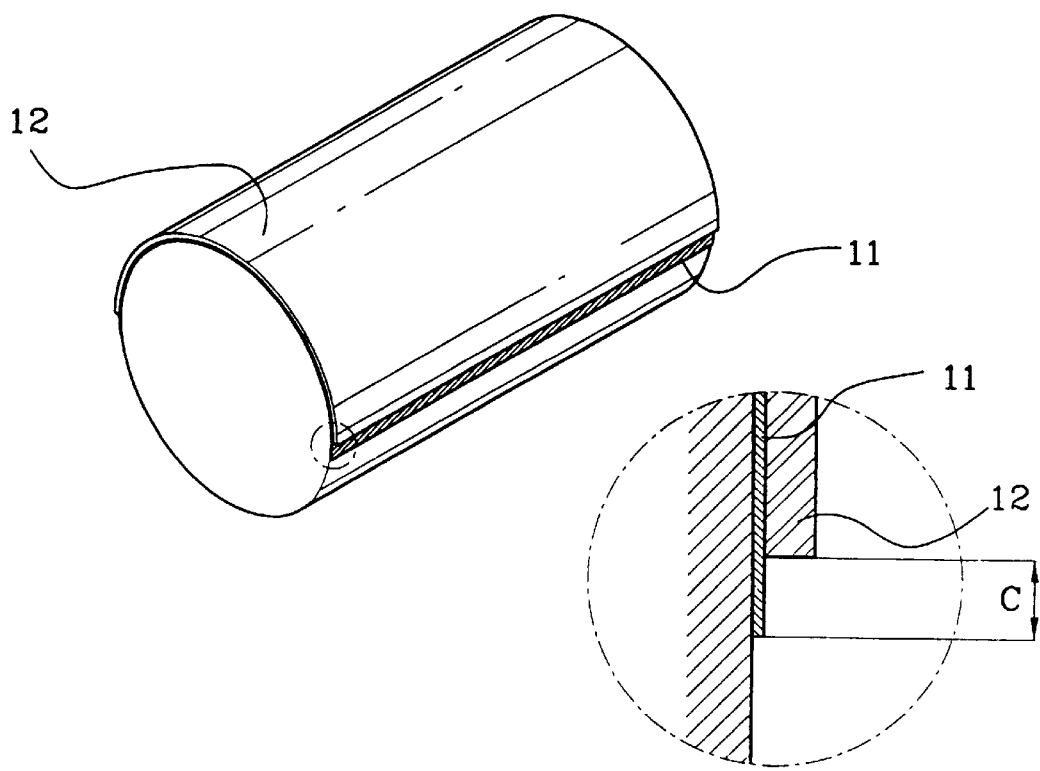
FIG. 9B
FIG. 10
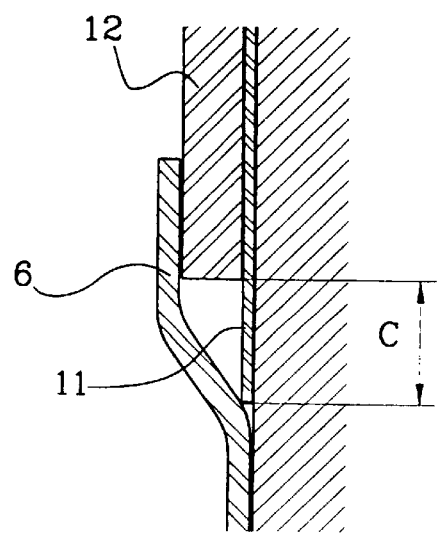

0.05~0.2mm 0.05~0.2mm

METHOD FOR MANUFACTURING RIM OF STEERING WHEEL FOR VEHICLES

BACKGROUND OF THE INVENTION

1. Field of the Invention

The present invention relates to a method for manufacturing a rim of a steering wheel for vehicles, and more particularly, to a method for manufacturing a rim of a steering wheel of high quality using a hydraulic transfer method.

2. Description of the Related Art

FIG. 1 shows an example of a method for manufacturing a rim of a steering wheel for vehicles. As shown in FIG. 1, a first molding portion 2 formed of soft PVC or urethane is formed on and around a hub core 1. Referring to FIG. 2, the first molding portion 2 is wrapped with leather 3, and a wood portion 4 is formed around the remaining hub core 1 by processing wood suitable for the shape of the hub core 1 and attaching the processed wood thereto. Alternatively, the wood portion 4 can be formed by layering wood laminae, cut in the form of a sheet, or mixing sawdust with resin and molding the mixture and attaching a thin wood sheet thereon.

However, the above manufacturing methods are complicated and not suitable for mass production. Also, the manufacturing cost is high.

SUMMARY OF THE INVENTION

To solve the above problems, it is an objective of the present invention to provide a method for manufacturing a rim of a steering wheel for vehicles using a hydraulic transfer method so that a portion of the rim can be manufactured in a large quantity at a relatively low cost while achieving a high quality appearance thereof.

It is another objective of the present invention to provide a method for manufacturing a rim of a steering wheel for vehicles in which a transferring process is performed using a mask tape or a rubber jig (hereinafter, referred to as a mask member) so that various wood patterns and other patterns can be available.

Also, it is yet another objective of the present invention to provide a method for manufacturing a rim of a steering wheel for vehicles by which accurate and clear match of pattern on a steering wheel whose shape is not suitable for transfer is possible.

Accordingly, to achieve the above objective, there is provided a method for manufacturing a rim of a steering wheel for vehicles, which comprises the steps of: (A) forming a molding member of a urethane material which constitutes a part of the rim of a steering wheel; (B) forming a masking portion by attaching a first mask member to a part of a surface of the molding member; (C) forming a first transfer surface by performing a hydraulic transfer on a surface where the first mask member does not adhere; (D) forming a coating film on the first transfer surface; (E) removing the first mask member to reveal a surface where transfer is not performed; (F) performing a second hydraulic transfer on the surface where transfer is not performed; and (G) cleaning the coating film.

To achieve the second objective, there is provided a method for manufacturing a rim of a steering wheel for vehicles, which comprises the steps of: (A) forming a molding member of a urethane material which constitutes a part of the rim of a steering wheel; (B) forming a masking portion by attaching a first mask member to a part of a surface of the molding member; (C) forming a first transfer surface by performing a hydraulic transfer on a surface where the first mask member does not adhere; (D) attaching a second mask member to the first transfer surface and removing the first mask member; and (E) performing a second hydraulic transfer on the surface where the second mask member does not adhere.

To achieve the third objective, there is provided a method for manufacturing a rim of a steering wheel for vehicles, which comprises the steps of: (A) forming a molding member of a urethane material which constitutes a part of the rim of a steering wheel; (B) forming a masking portion by attaching a first mask member to a part of a surface of the molding member; (C) marking a junction line by marking a blade scar approximately at a middle portion of the mask member of the rim of a steering wheel which is placed on a horizontal rotatable table and removing a part of the mask member disposed under the junction line; (D) covering an upper portion of the mask member which is not removed; (E) performing a transfer on a lower surface under the junction line and cleaning and drying the transferred surface and coating a PVA solution on the transferred surface and drying the coated surface; (F) marking a separation line by placing the rim of a steering wheel on the horizontal rotatable table and adjusting and fixing the height of a blade to be disposed about 0.05–0.2 mm lower than that in the step (C); and (G) removing the remaining mask member and a part of a PVA film and performing a second transfer and cleaning and drying a second transfer surface.

BRIEF DESCRIPTION OF THE DRAWINGS

The above objectives and advantages of the present invention will become more apparent by describing in detail a preferred embodiment thereof with reference to the attached drawings in which:

FIG. 9a is a view showing a state in which the first transfer surface 11 and the second mask member 12 are formed according to another preferred embodiment of present invention and FIG. 9b is an enlarged view of part of FIG. 9a;

FIG. 10 is a view showing a state in which the transfer film 6 and the second mask member 12 are formed according to another preferred embodiment of present invention;

DETAILED DESCRIPTION OF THE INVENTION

Figure 1:
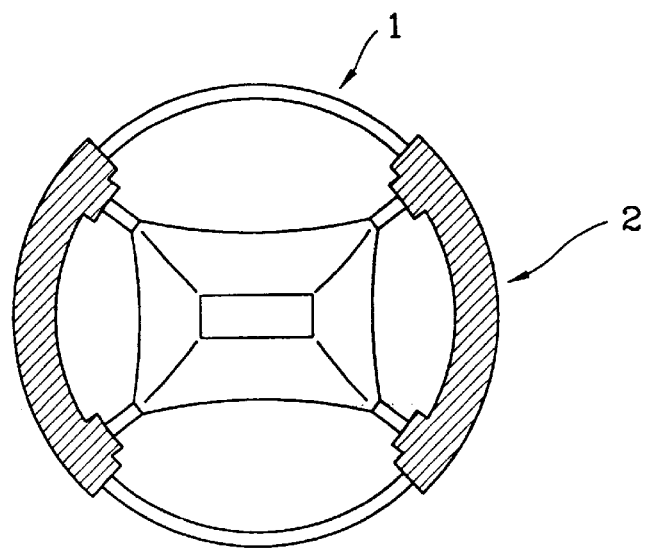
FIGS. 1 and 2 are views showing a portion of a rim of a steering wheel according to a conventional manufacturing method.
Figure 2:
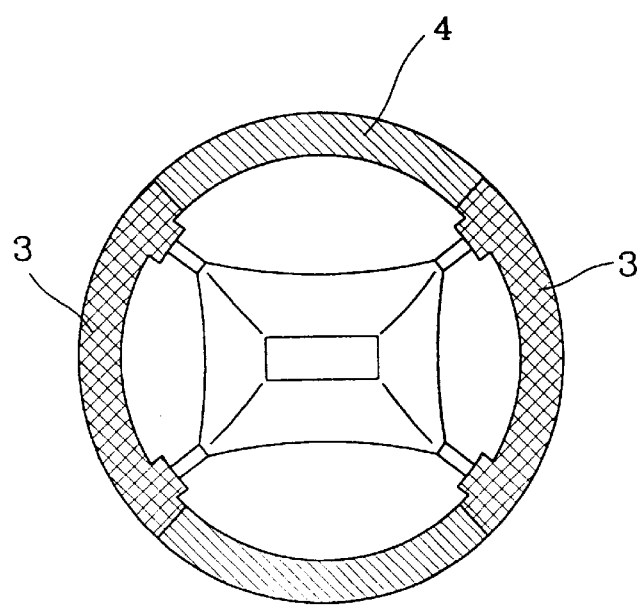
Figure 3:
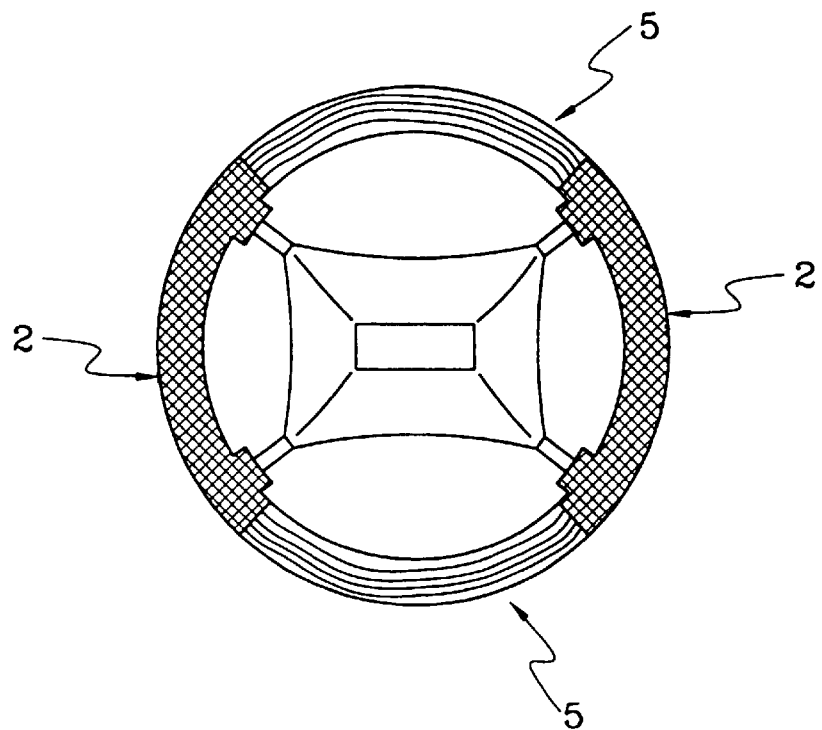
FIG. 3 is a view showing a rim of a steering wheel manufactured according to a preferred embodiment of the present invention.

Referring to FIG. 3, according to the present invention, a second molded portion 5 is formed on and around the hub core 1 of FIG. 1 in a hydraulic transfer method. The second molded portion 2 is formed of soft or hard urethane by molding urethane, preferably hard urethane, and performing the hydraulic transfer according to the present invention, which will be described later. The second molded portion 5 can be formed of a material made by adding sawdust to resin in addition to the above materials. Any material such as ABS (acrylonitrile butadiene styrene), PP (polypropylene) or PVC (polyvinyl chloride) can be used therefor. However, the material of the molded portion of a steering wheel must meet various test requirements, particularly, the material should not generate sharp fragments that could harm humans in a crash test. In consideration of the above and as a result of the crash test, urethane which is used for the present invention meets all requirements and is considered to be preferable.

Figure 4:
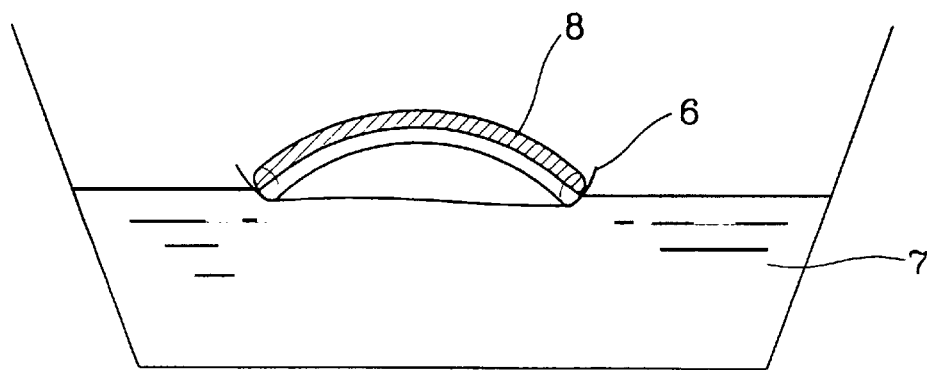
FIG. 4 is a view showing a portion of steps for manufacturing a portion of a rim of a steering wheel in a hydraulic transfer method using a mask according to the present invention.

FIG. 4 shows a method of transferring a predetermined pattern on a portion of the second molding portion 5 according to the present invention.

For example, the second molded portion 5 only is separated from the steering wheel. A bent circular bar, which is the result of the separation, is masked with a first mask member 8 lengthwise covering half the circumference of the section of the bar. A tape or rubber is used for the first masking member 8. A transfer film 6 floats on water 7 and the portion of the bar that is not masked is located on the bottom and pushed downward against the transfer film 6. Then, a first transfer is performed due to hydraulic pressure. Consequently, the surface where the transfer is performed has a pattern, e.g., a wood pattern.

Figure 5A:
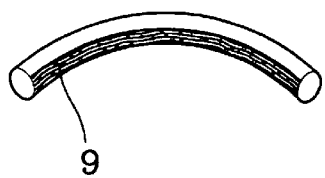
FIGS. 5a and 5b are views for explaining manufacturing steps after the step shown in FIG. 4.

After cleaning and drying the transferred portion of the bent bar, the surface where the first transfer has been performed is coated with a PVA (polyvinyl alcohol) solution and dried. When the first mask member 8 that is a tape is removed, a PVA coating film 9 is formed on the patterned area and the masked area is revealed clearly, as shown in FIG. 5a.

The PVA solution is water-soluble. When the PVA solution is applied and dried, a film is formed to protect a printed pattern layer thereunder and prevent overlapping of patterns. Since the coating film in the present invention is not limited to PVA, other materials which are water-soluble and can form a film when dried to protect a printed pattern layer already formed thereunder without discoloration or damage can be used therefor. For example, starch (farina) can be used instead of the PVA solution.

The second transfer is performed on the remaining surface in the same manner as the first transfer. Here, the transfer may be made on a part of the area where a pattern is already formed and the coating film 9 is present. However, after the second transfer, when the area where a pattern is already formed and the coating film 9 is formed thereon is cleaned with hot water, preferably at a temperature over about 30° C., the area is dissolved and washed away so that the pattern formed on the coating film 9 through the second transfer is removed and the pattern formed through the first transfer is clearly revealed.

Figure 5B:

When the product resulting from the above cleaning step is dried, as shown in FIG. 5b, a clearly printed pattern can be formed without damage to the shape of the pattern such as overlapping, extending, or distorting of patterns. Also, even if the edge of the first mask member 8 is not accurately attached in a form covering about half the surface subject to the transfer, patterns can be accurately matched when the second transfer is performed.

Figure 6:
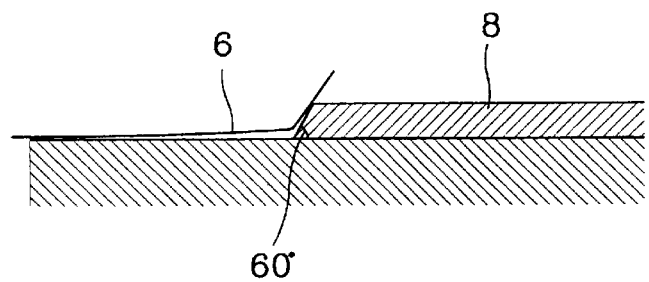
FIG. 6 is a view showing a state in which the transfer film 6 and the first mask member 8 are formed correctly.

Preferably, the edge of the first mask member 8 closely contacting an object subject to the transfer is slanted at an angle of 60° or less with respect to the horizontal surface as shown in FIG. 6. Then, the patterns separately transferred through the first and second transfers are smoothly connected at the boundary area between the patterns.

Figure 7:
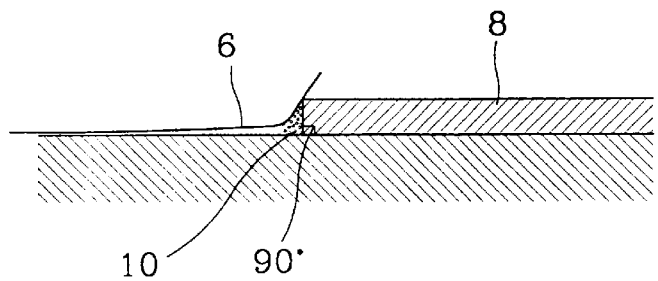
FIG. 7 is a view showing a state in which the transfer film 6 and the first mask member 8 are formed incorrectly.

If the edge of the first mask member 8 has an angle greater than 60°, for example, nearly 90° as shown in FIG. 7, bubbles 10 are trapped between the transfer film 6 and the first mask member 8 and cannot escape therefrom, thus, when a second transfer is performed, a print is not made on the connection area between the first and second transfers. As a result, the portion where no transfer is made appears in the form of a strip.

In the above preferred embodiment, a pattern is accurately and separately transferred onto the hard urethane molded portion of a steering wheel using the first mask member 8 and the coating film 9 through the first and second transfer steps. However, since the present invention is not limited to the described embodiment, two or more patterns can be separately transferred on the same surface through first, second, and third transfer steps so that various patterns can be obtained.

FIGS. 8a through 8d show another preferred embodiment of the present invention.

Figure 8A:
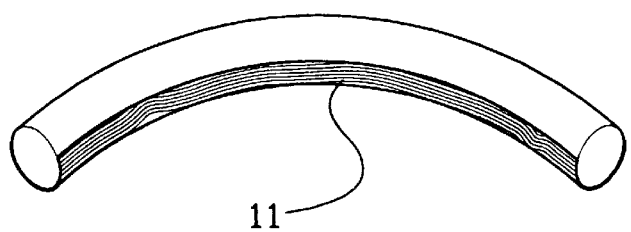
FIGS. 8a through 8d are views for explaining a manufacturing method according to another preferred embodiment of the present invention.

As in the above embodiment, a first transfer surface 1 is first formed on a bottom surface. After the first transfer surface 1 is cleaned and dried, the first mask member 8 is removed, as shown in FIG. 4, and the first transfer surface 11 is revealed as shown in FIG. 8a. A second mask member 12 where the transfer is performed is applied to the first transfer surface 11 as shown in FIG. 8b.

Figure 8B:
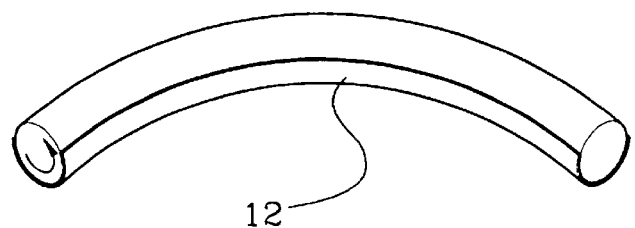
Figure 8C:
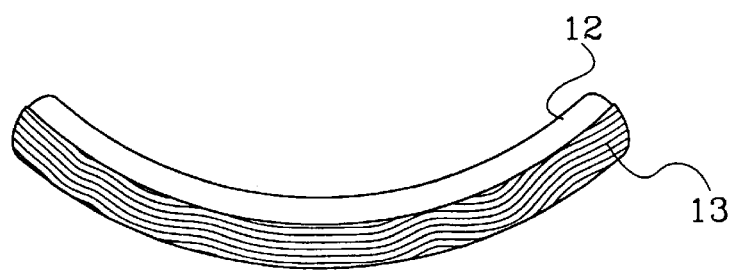
Figure 8D:
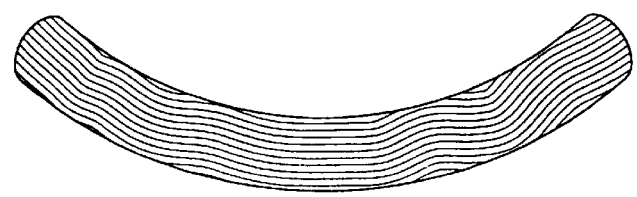

Next, when the other half surface where the transfer is not performed is turned 180° and a transfer is performed thereon, a second transfer surface 13 is formed as shown in FIG. 8c. Finally, the second transfer surface 13 is cleaned and dried, or dried without cleaning, and the second mask member 12 shown in FIG. 8c is removed. Then, a clear printed pattern can be formed as shown in FIG. 8d.

It is preferable that, in the step of FIG. 8b, the edge of the second mask member 12 contacting the first transfer surface 11 is spaced from the first transfer surface 11 by a predetermined gap (c) as shown in FIGS. 9a and 9b. Then, a smooth connection of the patterns is achieved in the area where the first and second transfers are made.

That is, as shown in FIG. 10, when the a second transfer, film 6 is used for a second transfer after the second mask member 12 is attached, no transfer occurs along a distance (c) because the second mask member 12 is coupled to the transfer film 6 in a way that covers the first transfer surface 11 over. Thus, the surface where the pattern has already been formed can be revealed as a long predetermined length.

Figure 11:
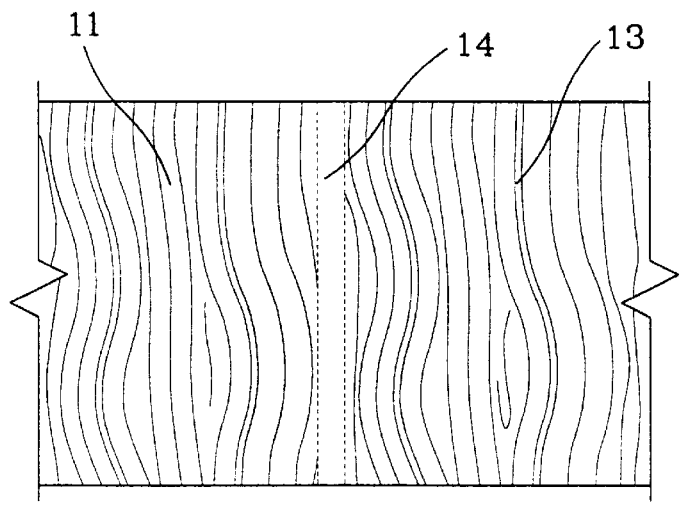
FIG. 11 is a view showing a state in which patterns are not matched correctly.

The distance (c) is preferably 0.1–0.4 mm. Although the distance can be slightly different according to the members, in a particular case of manufacturing a steering wheel for vehicles, a distance of 0.2 mm results in an accurate match of patterns according to actual experience. When the distance (c) is too narrow, a non-transfer strip 14 is generated as shown in FIG. 11. If the distance (c) is too wide, patterns are overlapped on the transfer surface.

Although a separate masking method using a mask member through first and is second transfer steps is described in the preferred embodiment, the present invention is not limited thereto. A more accurate and complicated pattern can be transferred by a method of masking through three or more transfer steps.

Also, although the pattern of the transfer film used in the hydraulic transfer method according to the present invention is described to be a typical wood pattern showing the texture of wood, the present invention is not limited thereto. Any form of pattern, for example, a stone pattern, a latticed carbon fiber pattern or a metal surface pattern can be used therefor.

Figure 12:
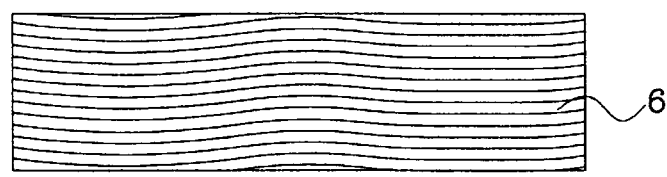
FIG. 12 is a view showing an example of a pattern of the transfer film.
Figure 13:
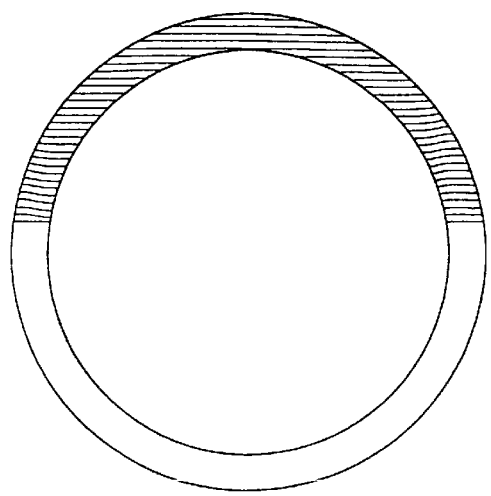
FIG. 13 is a view showing a steering wheel to which the transfer film of FIG. 12 is applied.
Figure 14:
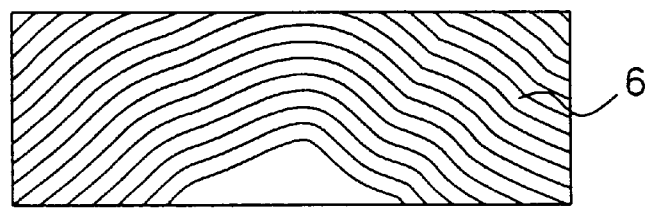
FIGS. 14 and 15 are views showing another preferred example of a pattern and a steering wheel adopting the pattern.
Figure 15:
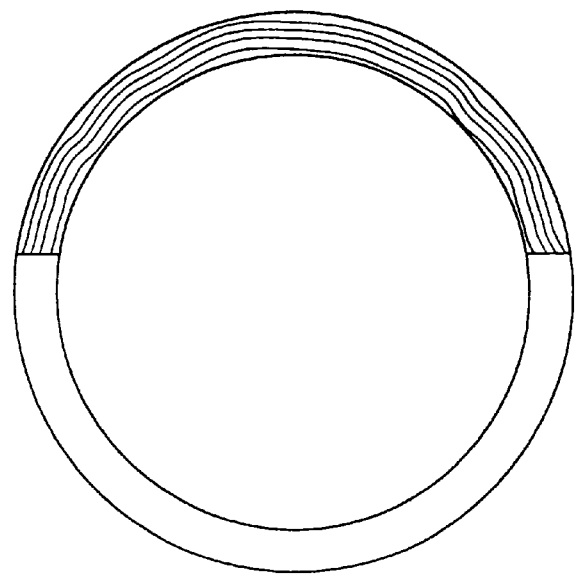

For example, when a steering wheel is hydraulic-transferred to have the texture of a wood pattern, a transfer film having a linear wood pattern as shown in FIG. 12 results in an unnatural shape as shown in FIG. 13, not giving the texture of wood and being inferior in view of aesthetics. It is preferable to use the transfer film 6 having a pattern as shown in FIG. 14. As shown in FIG. 15, a pattern is formed along a rim of a steering wheel. The pattern as shown in FIG. 14 can be prepared and designed using computer graphics to be suitable for the shape of the rim.

Figure 16:
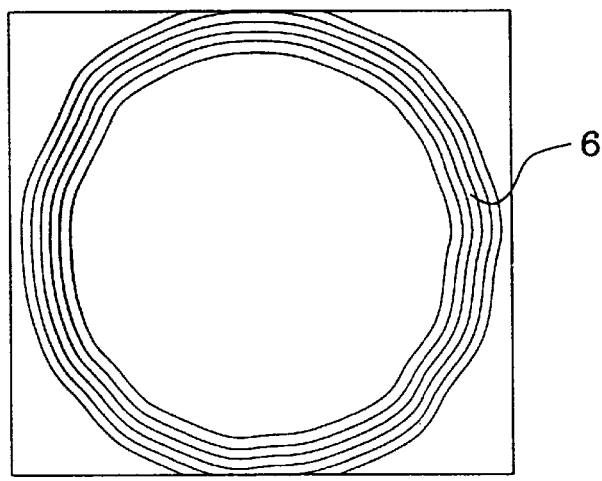
FIGS. 16 and 17 are views showing yet another preferred example of a pattern and a steering wheel adopting the pattern.
Figure 17:
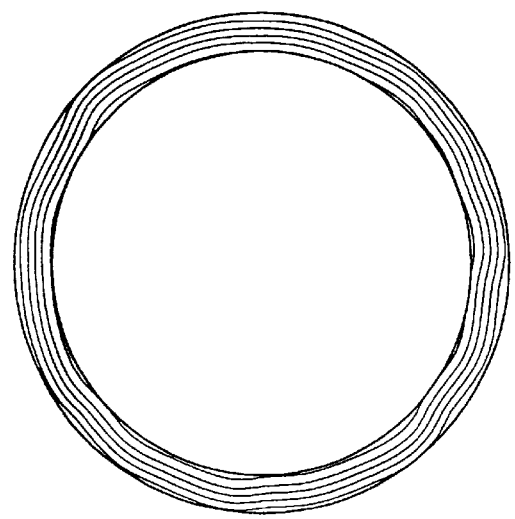

Another preferred embodiment of the pattern of the transfer film 6 is shown in FIG. 16. The entire circular pattern above, designed using computer graphics, can be transferred onto a rim of a steering wheel with one transfer. FIG. 17 shows the steering wheel where the wood pattern is smoothly connected in a circular form.

FIGS. 18 through 23 show yet another preferred embodiment of the present invention in which a mask member is used.

Figure 18:
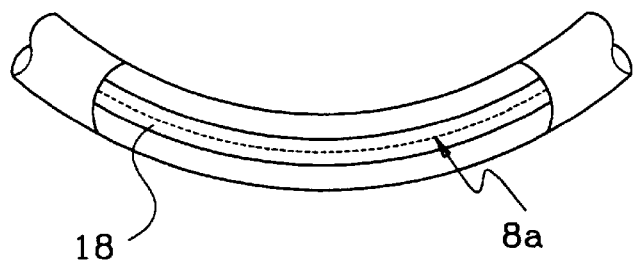
FIG. 18 is a view showing yet another preferred embodiment of the present invention.
Figure 19:
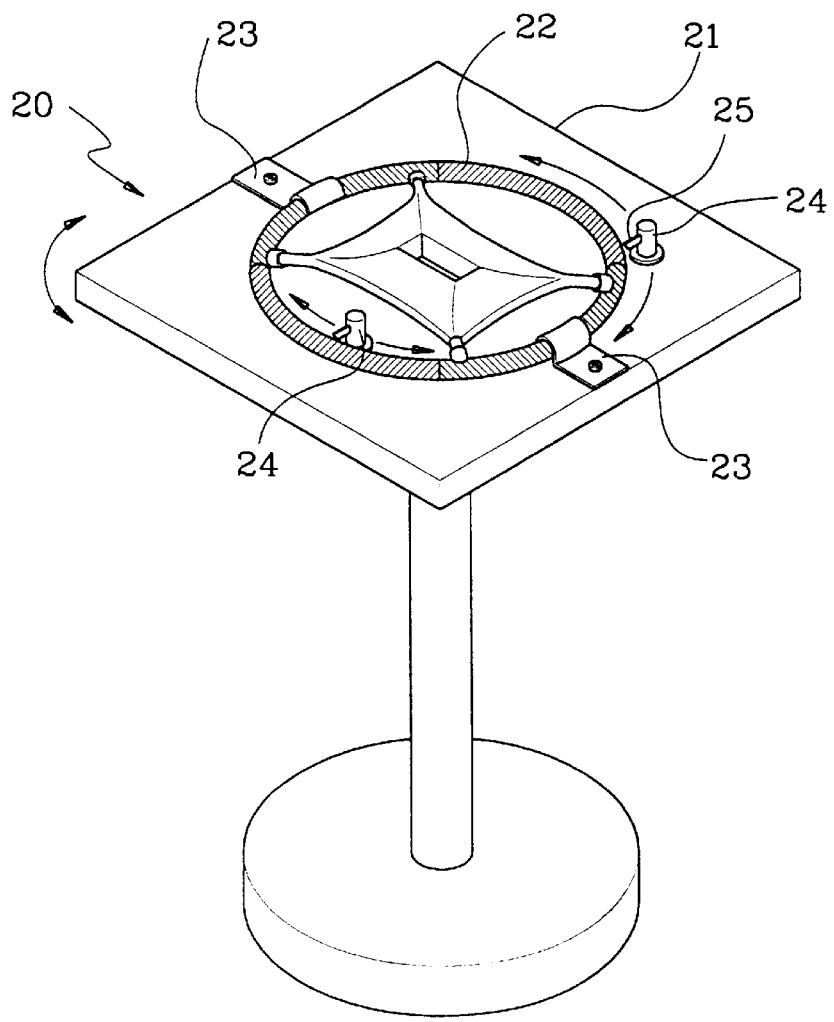
FIG. 19 is a view showing an apparatus for forming a coupling line on the mask member of FIG. 18.

As shown in FIG. 18, a mask member 18 having a strip shape having a width of about 4–5 mm is attached to the inner and outer circumferential parts of a rim of a steering wheel 22. The rim of the steering wheel 22 is placed on an upper plate 21 of a horizontally rotatable table 20 and fixed by a clamp 23, as shown in FIG. 19.

Figure 20:
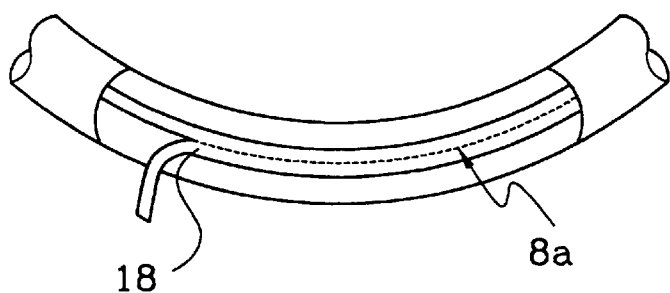
FIGS. 20 and 21 are views for explaining the subsequent steps after the step shown in FIG. 19.

A blade holder 24 capable of adjusting the height of a blade 25 is installed on the upper plate 21. The blade 25 is fixedly held by the blade holder 24 such that the height of the blade 25 can be flush with a junction line 8a, a dotted line marked approximately in the middle of the mask member 18. In a state in which the rim of the steering wheel 22 is fixed and the blade holder 24 slightly presses the outer circumferential surface of the rim of the steering wheel 22, as the table 20 rotates, a blade scar is made along the junction line 8a. Then, the mask member 18 of the lower portion of the junction line 8a is removed as shown in FIG. 20.

The above step of incising the mask member 18 adhering to the rim of the steering wheel 22 is performed from the inner and outer circumferential side of the rim of the steering wheel 22 using the blade holder 24. Also, the mask member 18 can be incised by rotating the upper plate 21 where the steering wheel 22 is fixed and fixedly holding the blade holder 24 with a hand. On the contrary, the mask member 18 can be incised by rotating the blade holder 24 from the inner and outer circumferential side of the rim of the steering wheel 22 while keeping fixed the upper plate 21 where the rim of the steering wheel 22 is mounted.

Figure 21:
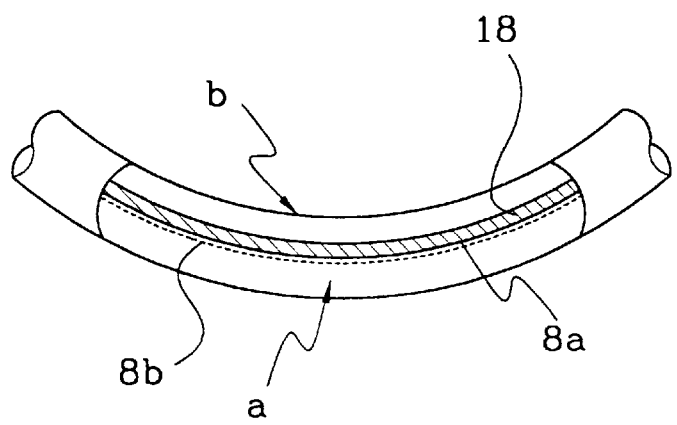

As shown in FIG. 21, a PVA solution is applied to a surface b and dried and transfer is performed on a surface a. Here, the PVA solution is made by mixing PVA and water in a weight ratio of 1(PVA):12–16(water) and completely dissolving the mixture at the temperature of 60–70° C. and adding alcohol to be at 15–20 wt %. The above PVA solution dries fast and forms the thinnest film so that the working speed is faster. Spraying of the PVA solution is possible and the cleaning step is easy.

Figure 22:
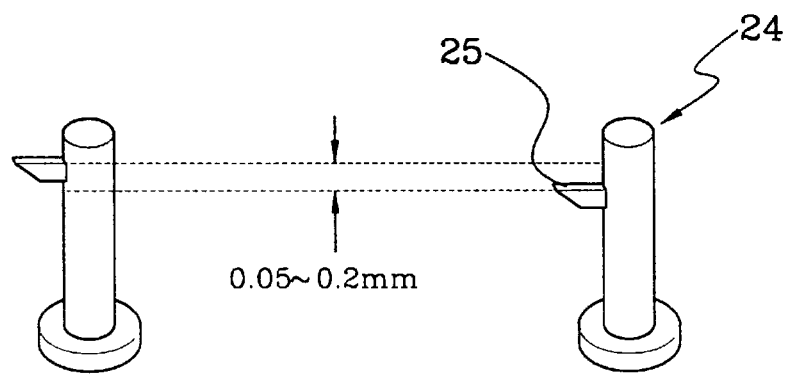
FIG. 22 is a view showing the position of the blade 25 of the blade holder 24 of the apparatus shown in FIG. 19.

After the surface a where the transfer is made is cleaned and dried, the PVA solution is applied and dried and the steering wheel 22 is installed on the table 20. As shown in FIG. 22, the height of the blade 25 disposed at the right side in the drawing is adjusted to be about 0.05–0.2 mm lower than the height of the left blade 25, used previously to draw a (dotted) separation line 8b as shown in FIG. 21.

The remaining mask member 18 and a part of the PVA film shown in FIG. 21 are removed and a second transfer is performed on the surface b. After cleaning and drying the surface b, a clear transfer is completed so that no non-transferred surface is left and there is no overlapping of the transferred patterns.

Figure 23:
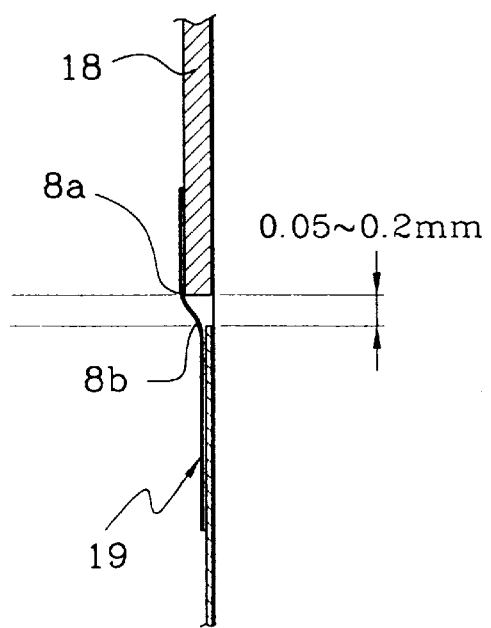
FIG. 23 is a partial sectional view for explaining the forming and incision of the PVA protective film described in FIG. 21.

FIG. 23 shows a magnified section of a major portion around the mask member 18 shown in FIG. 21 before the transfer onto the surface b.

As shown in the drawing, a PVA coating film 19 is formed overlapping the mask member 18. Thus, when the mask member 18 is removed by forming a separation line 8b, which is a second blade scar about 0.05–0.2 mm under the blade scar of the middle junction line 8a, the PVA protective film 19 and the mask member 19 formed from and above the separation line 8b are removed.

In an another preferred embodiment of FIG. 21, the same result can be obtained by attaching a mask member, instead of applying a PVA solution to the surface b. In the former method, when a PVA solution is applied to the surface a, the surface b should not be stained with the PVA solution. Also, since an additional mask member is not needed in the above method, a mask member can be eliminated and a step relating to attachment of the mask member can be omitted. Meanwhile, in the latter method, when the PVA solution is applied to the surface a, since the surface b is covered with the mask member, the PVA solution can be applied by a spraying or dipping method so that the working time can be reduced.

The preferred embodiments described with reference to FIGS. 18 through 23 enable a fast working speed so that mass production is possible and uniformity of products is improved, lowering the defect rate.

As described above, according to the present invention, since a wood texture resembling natural wood can be represented at a cost lower by 2–3 times or more, a rim of a steering wheel of high quality can be manufactured in mass.

Also, the present invention for forming a wood pattern, for example, on a hard urethane gives not only the same touch and feel as that of natural wood, but also superior texture.

Furthermore, a transfer of a pattern or picture on a product having a complicated bent portion on which it is difficult to transfer a pattern, for example, a rim of a steering wheel for vehicles as well as cases for various musical instruments or a fishing rod, can be clearly performed without an unsmooth connection portion or a step line between patterns or pictures.

Although the above description of the present invention covers a method for manufacturing a rim of a steering wheel for vehicles, the present invention is not limited thereto. It is obvious that a transfer can be performed on surfaces of any kind of product such as plastic, aluminum, steel, or wood, having a complicated bent or curved portion.

It is noted that the present invention is not limited to the preferred embodiment described above, and it is apparent that variations and modifications by those skilled in the art can be effected within the spirit and scope of the present invention defined in the appended claims.

What is claimed is:

1. A method for manufacturing a rim of a steering wheel for vehicles, said method comprising:
   (A) forming a molded member of a urethane material as a part of a rim of a steering wheel, said molded member having an elongate circumferential surface;
   (B) forming a mask by attaching a longitudinal first mask member covering only a longitudinal first part of the elongate circumferential surface of said molded member, leaving a longitudinal second part of the elongate circumferential surface exposed;
   (C) transferring a first pattern onto the longitudinal second part of the elongate circumferential surface of said molded member, where said longitudinal first mask member is not present, by hydraulic transfer;
   (D) attaching a longitudinal second mask member to said first pattern and removing said longitudinal first mask member to reveal the longitudinal first part of the elongate circumferential surface of said molded member to which the first pattern has not been transferred; and
   (E) transferring a second pattern onto the longitudinal first part of the elongate circumferential surface of said molded member where said second mask member is not present, joining said first pattern.

2. The method as claimed in claim 1, wherein the longitudinal edge of said longitudinal second mask member is spaced from the longitudinal edge of said first pattern by a distance, transverse to the longitudinal edge of said first pattern, within a range from 0.1 to 0.4 mm.

3. The method as claimed in claim 2, wherein the distance is 0.2 mm.

4. The method as claimed in claim 1, wherein said longitudinal first mask member covers one-half of the elongate circumferential surface of said molded member.

5. The method as claimed in claim 1 including attaching the longitudinal second mask member so that at least one longitudinal edge of said first pattern is spaced from a longitudinal edge of said longitudinal second mask member by a distance transverse to the longitudinal edge of said longitudinal second mask member and said first pattern is exposed at the longitudinal edge of said longitudinal second mask member.

6. A method for manufacturing a rim of a steering wheel for vehicles, said method comprising:
   (A) forming a molded member of a urethane material as a part of a rim of a steering wheel, said molded member having an elongate circumferential surface;
   (B) forming a mask by attaching a longitudinal first mask member covering only a longitudinal first part of the elongate circumferential surface of said molded member, leaving a longitudinal second part of the elongate circumferential surface exposed;
   (C) transferring a first pattern onto the longitudinal second part of the elongate circumferential surface of said molded member, where said longitudinal first mask member is not present, by hydraulic transfer;
   (D) forming a coating film covering said first pattern;
   (E) removing said longitudinal first mask member to reveal the longitudinal first part of the elongate circumferential surface of said molded member to which said first pattern has not been transferred;
   (F) transferring a second pattern onto the longitudinal first part of the elongate circumferential surface, joining said first pattern, by hydraulic transfer; and
   (G) removing said coating film.

7. The method as claimed in claim 6, wherein said coating film is polyvinyl alcohol.

8. The method as claimed in claim 6, wherein an edge of said longitudinal first mask member adhering to the longitudinal first part of the elongate circumferential surface of said molded member is slanted at an angle of no more than 60° with respect to the elongate circumferential surface of said molded member, when the elongate circumferential surface is viewed in cross-section.

9. The method as claimed in claim 6, wherein said longitudinal first mask member cover one-half of the elongate circumferential surface of said molded member.

10. A method for manufacturing a rim of a steering wheel for vehicles, said method comprising:
   (A) forming a molded member of a urethane material as a part of a rim of a steering wheel;
   (B) forming a mask by attaching a longitudinal first mask member to a first surface of said molded member;
   (C) marking a junction line by making a longitudinal blade scar approximately at the middle of said longitudinal mask member on the rim and removing part of said longitudinal mask member on a first side of the junction line;
   (D) covering portion of the part of said longitudinal mask member which is not removed;
   (E) transferring a pattern onto a surface on the first side of the junction line, cleaning and drying the transferred pattern, applying a polyvinyl alcohol(PVA) solution onto the transferred pattern, and drying the surface coated with the PVA solution to form a PVA film;
   (F) marking a separation line spaced about 0.05–0.2 mm from the junction line; and
   (G) removing the remaining part of said longitudinal mask member and a part of the PVA film on the first side of the junction line, transferring a second pattern onto a second transfer surface of said molded member, and cleaning and drying the second transfer surface.

11. The method as claimed in claim 10, wherein covering a portion of the part of the mask member includes coating a surface with a PVA solution and drying the coated surface.

12. The method as claimed in claim 10, wherein said covering a portion of the part of the mask member includes attaching a second mask member.

13. The method as claimed in claim 10, including preparing the PVA solution by mixing PVA and water in a weight ratio of 1:12–16 and completely dissolving the PVA in the mixture at a temperature of 60–70° C., and adding alcohol to the mixture to reach 15–20 wt % of the PVA solution.

* * * * *